Figure 1:
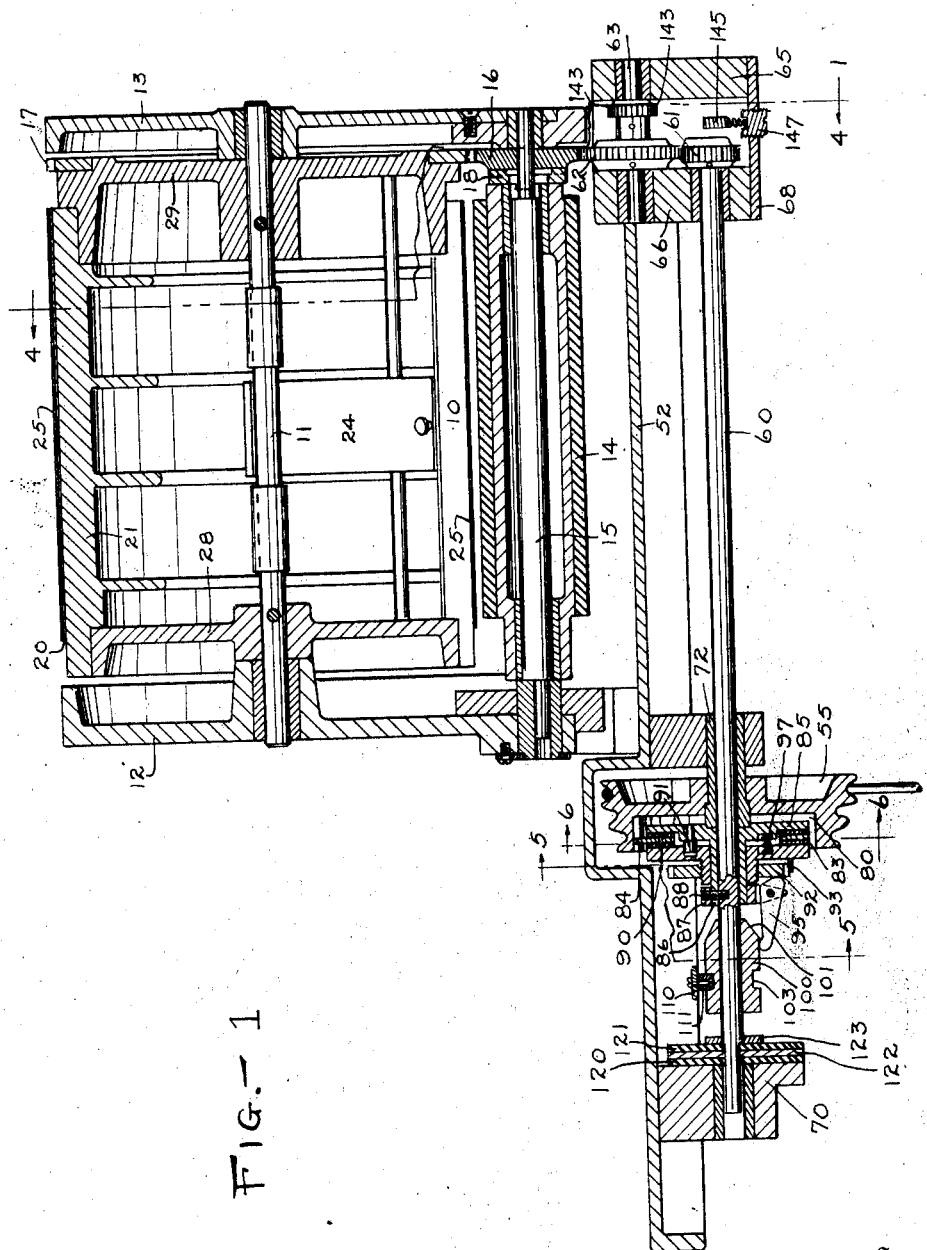

May 8, 1928. 1,668,867
H. C. OSBORN
POWER DRIVE MECHANISM
Original Filed June 4. 1926 4 Sheets-Sheet 1

May 8, 1928.　　　　　　　　　　　　　　　　　　1,668,867
H. C. OSBORN
POWER DRIVE MECHANISM
Original Filed June 4, 1926　　4 Sheets-Sheet 2

May 8, 1928. 1,668,867
H. C. OSBORN
POWER DRIVE MECHANISM
Original Filed June 4, 1926 4 Sheets-Sheet 4
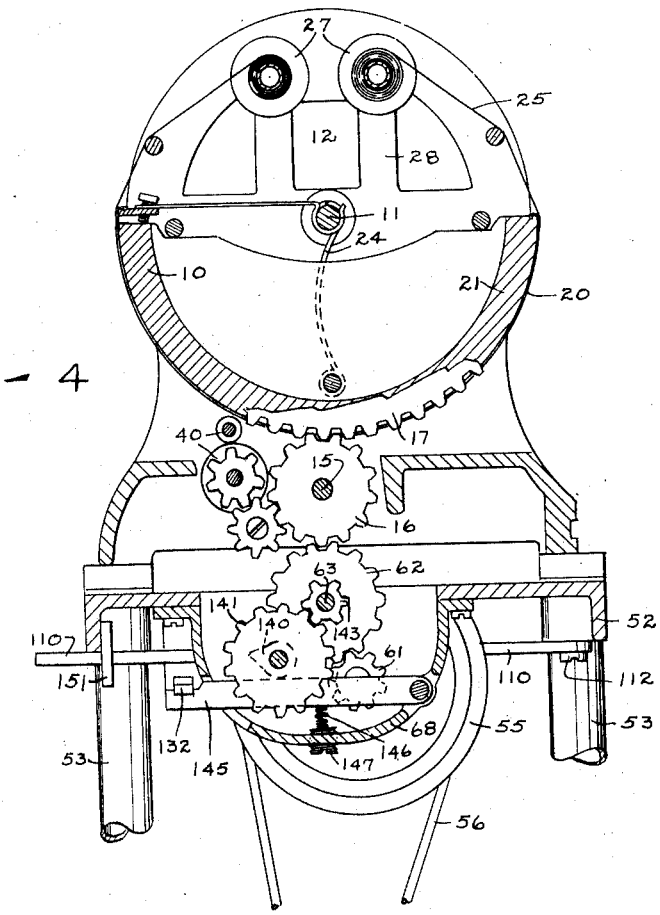
FIG.-4
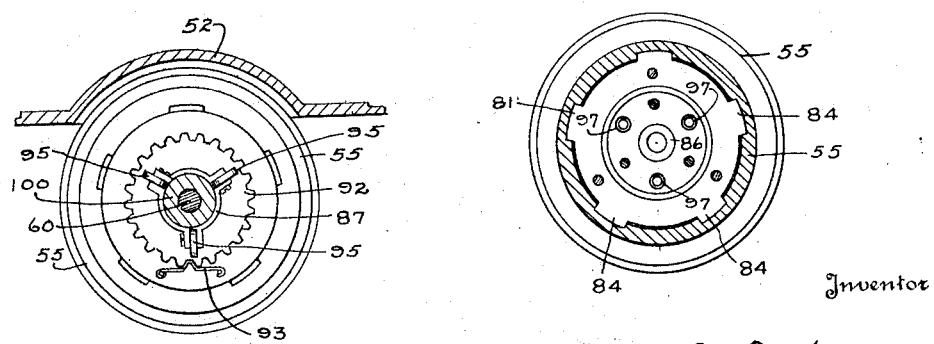
FIG.-5
FIG.-6
Inventor
Henry C. Osborn,
By Bates, Macklin, Golrick & Hearn
Attorneys.

Patented May 8, 1928.

1,668,867

UNITED STATES PATENT OFFICE.

HENRY C. OSBORN, OF CLEVELAND, OHIO, ASSIGNOR TO THE AMERICAN MULTIGRAPH COMPANY, OF CLEVELAND, OHIO, A CORPORATION OF OHIO.

POWER DRIVE MECHANISM.

Original application filed June 4, 1926, Serial No. 113,601. Divided and this application filed October 4, 1926. Serial No. 139,257.

This invention relates to a mechanism adapted to be coupled with a continuously operating source of power for delivering controlled periodic rotations to the driven machine, as for instance a rotary printing machine. More particularly the power drive is controlled by a manually operable member and when released gives a single rotation to the printing machine, stopping the same subject to a succeeding release. My power drive mechanism is well adapted for driving a multigraph.

The above characteristics, and others which are comprised within my invention, will be hereinafter described in connection with a preferred embodiment of the invention illustrated in the drawings hereof, and the essential characteristics will be summarized in the claims.

Figure 2:
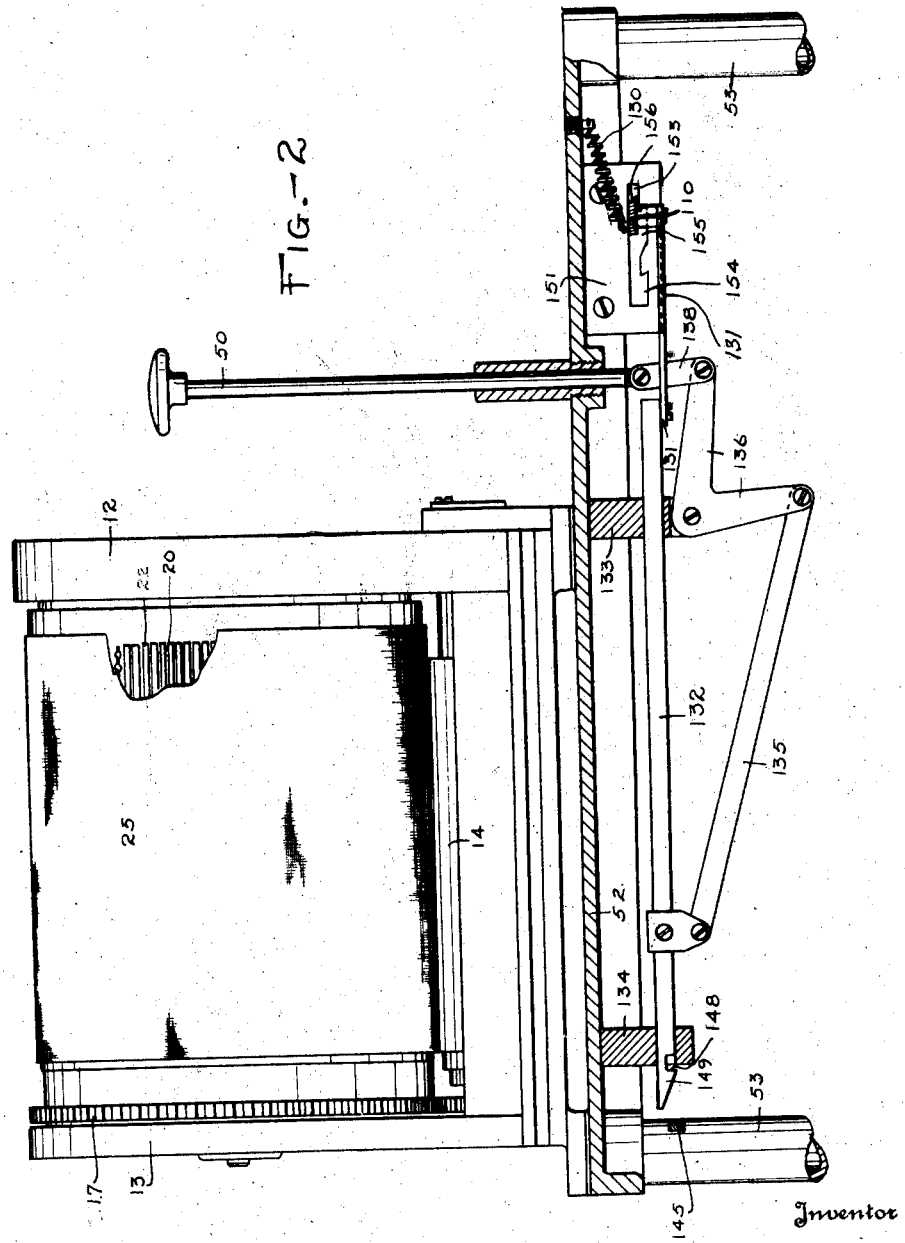
Figure 3:
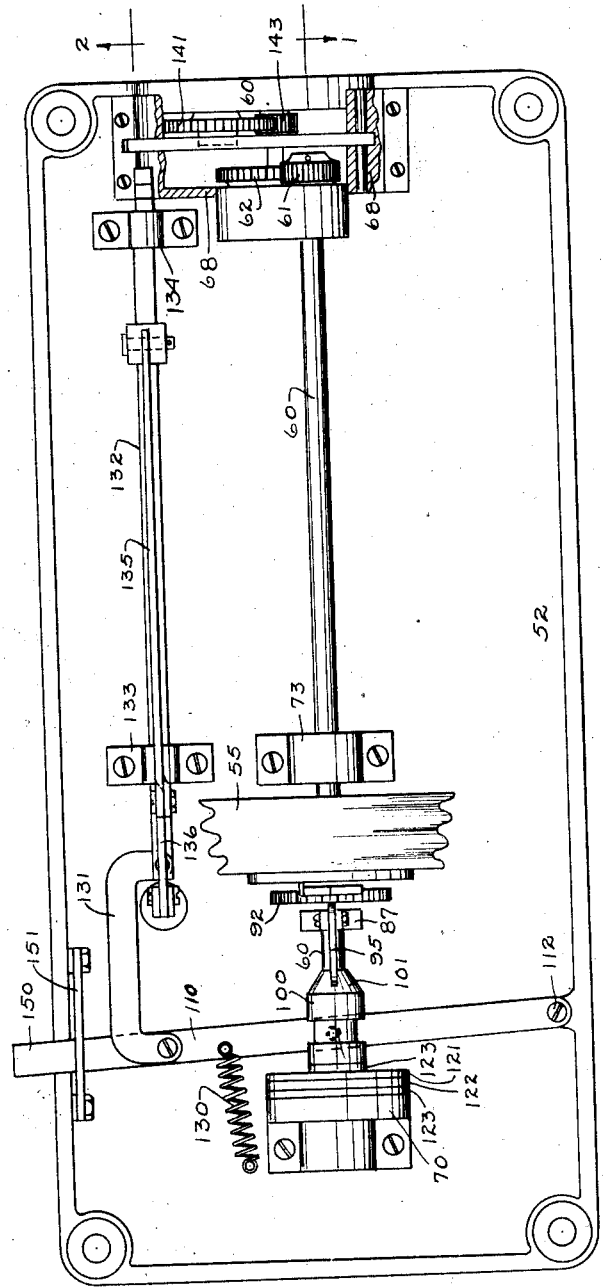

In the drawings, Fig. 1 is a vertical longitudinal section through my power drive and a surmounting multigraph with which it operates, as indicated by the line 1—1 on Fig. 3; Fig. 2 is a sectional rear elevation on the line 2—2 on Fig. 3. Fig. 3 is a bottom plan of the power drive mechanism, the gear casing cover being broken away; Fig. 4 is a vertical transverse section through the same parts and a portion of the stand for the complete mechanism, on the offset plane indicated by the line 2—2 on Fig. 1; Figs. 5 and 6 are vertical transverse sections through the clutch, on the planes indicated by the correspondingly numbered lines on Fig. 1.

The multigraph machine shown in Figs. 1, 2 and 4 comprises a rotary drum 10 mounted on a shaft 11, journalled in end frame plates 12 and 13 above a roller platen 14 mounted on a shaft 15. Gearing 16 and 17 and an Oldham coupling 18 connect the drum and platen.

I have shown, mounted on the drum, means for printing the body of a form letter, such means comprising a blanket 20 (shown conventionally in Fig. 4) stretched about a segment 21 on the drum and having raised overhanging members 22 (Fig. 2) for carrying embossed printing strips, not shown. The segment is shown as a semicylinder resting on the end members 28 and 29 (Fig. 1) of the drum and held in place by a spring hook 24 engaging the shaft 11. An inking ribbon 25 is shown as mounted on spools 27 carried between the end members of the drum, such ribbon extending intermediately about the printing form.

The paper may be fed to the multigraph manually or automatically as desired. I have shown no feeding mechanism, but have indicated at 40, Fig. 4, a pair of coacting rolls which may be geared with the platen and periodically caused to engage to control the feed, as will be well understood.

The frame of the power drive comprises a horizontal bed plate 52 which may rest on the top of a usual stand 53 which supports the driving motor (not shown). The multigraph machine rests on top of this bed plate. The power drive supports on its underside a pulley 55 connected by a belt 56 with the motor, and has a clutch controlled by a hand operated plunger 50 to connect such pulley with a shaft 60 which is geared with the multigraph machine.

The gearing connecting the power drive shaft 60 with the multigraph is best shown in Figs. 1, 3 and 4, and comprises a pinion 61 on the end of the shaft meshing with an idler gear 62 on a lay shaft 63, which idler meshes with the platen gear 16, which as heretofore stated meshes with the gear 17 on the multigraph drum. The lay shaft 63 is mounted in an end wall 65 of the bed plate 52 and a parallel depending web 66 of that plate. The left hand end of the shaft 60 is also mounted in such web. Beneath the web and the end wall is a removable bottom plate 68, these parts constituting a gear casing.

The main shaft 60 of the power drive is journalled at its left hand end in a bracket 70 depending from the bed plate 52. Intermediately it passes through a hub sleeve 72 of the pulley 55 which is journalled in a depending frame bracket 73. The pulley 55 as shown is conical, having several grooves of different diameter to receive the belt 56 from a reversely coned pulley on the motor. The pulley 55 also acts as one member of the manually controlled clutch about to be described.

The pulley 55 has in its left hand face Fig. 1, a circular recess 80 with several notches 81 at the periphery of the recess as shown more particularly in Fig. 6. Within this recess is a floating clutch disk 83, preferably faced on its opposite sides with leather, and having ears 84 occupying the notches. This disk is thus compelled to rotate with the pulley, but being shiftable axially with reference thereto. On the right hand side of the disk in Fig. 1 is a disk 85 which is rigid with the shaft, this disk being shown as having a sleeve 86 surrounded by a collar 87, both the collar and the sleeve being pinned to the shaft by a pin 88. Slidable on the sleeve 86 is another clutch member 90 which lies on the left hand side of the floating member 83. The disk 85 carries a pin 91 slidably occupying a hole in the disk 90, and thus these two disks cannot rotate independently. The disk 90 has a sleeve on which is threaded a disk 92. The threading enables the adjustment of the disk but it is held against displacement by a spring 93 (Fig. 5) engaging any one of a number of notches in the periphery of the disk.

Pivoted to the collar 87 (which is rigid on the shaft 60) are cam levers 95, of which three are shown, which bear at their inner edges against the disk 92 and at their outer or left hand ends against the exterior of a shiftable operating collar 100. This shiftable collar, which is splined on the shaft 60 to rotate with it, has a conical inner end 101 adapted to swing the coacting ends of the levers and thus cam the clutch disk 92 toward the right, when the collar is moved toward the right, Fig. 1, as it may be by an operating lever 110, which carries a roller 111 occupying a groove 103 in the collar.

When the collar 100 is relatively distant from the clutch, compression springs 97 force the disk 83 toward the left, thus freeing the constantly rotating member 81. When the collar 100 is forced toward the right, the levers 95 are swung outwardly, thus forcing the disk 90 toward the right and binding the leather faced disk 83 between the two clutch members 90 and 85, thus locking the clutch pulley 55 to the shaft 60.

It will be seen from the above description that when the collar 100 is shifted toward the right, Fig. 1, the clutch is engaged and the shaft 60 rotated and the multigraph drum and platen rotated accordingly. On the other hand, when the collar is shifted to the left, the clutch is free so that the driving of the shaft ceases.

To prevent further rotation of this shaft to momentum, when the clutch is released, I provide a very simple brake controlled by the left hand movement of the clutch collar. This, as shown, consists of a pair of leather disks 120 and 121 and an intermediate steel disk 122 all splined on the shaft 60 and adapted to bear against the adjacent face of the bearing bracket 70. A suitable washer 123 bears against the right hand end of the disk 121. When the clutch collar 100 is moved to its left hand position its end abuts this washer 123 and applies this brake, immediately stopping the rotation of the shaft 60. When the clutch collar is shifted away from this brake, the disk members may rotate with the shaft without material frictional drag against the frame bracket.

The lever 110 which operates the clutch collar 100 to apply the clutch or brake, is pivoted at 112 to the frame adjacent its rear edge. A tension spring 130 anchored to the frame and to this lever tends to maintain it in position with the brake set. The lever is connected by a link 131 (Fig. 3) to a sliding bar 132 mounted in ears 133 and 134 on the underside of the frame plate 52. This bar is connected by a link 135 (Fig. 2) with one arm of a bell crank 136 which is pivoted to the ear 133 depending from the frame. The other arm of the bell crank is connected by the link 138 with the manual plunger 50.

It results from the linking described that when the plunger 50 is depressed, the bar 132 is shoved toward the left in Fig. 2 (that is, toward the right in Figs. 1 and 3), setting the clutch and causing rotation of the drive shaft 60. This rotation continues as long as the plunger remains depressed. It may be held down manually or the parts may be locked in such engaged position by means hereinafter described, but ordinarily it is latched by mechanism which is released at the end of a rotation, thus giving periodic single rotations to the multigraph machine. This latching mechanism will now be described.

Suitably geared with the multigraph drum so as to make one rotation for each rotation of the drum is a cam 140 (Fig. 4). As shown, this cam is on the side of a gear 141 which is mounted on a stub shaft carried by the end wall 65 of the frame. This gear meshes with a pinion 143 rigid with the gear 62 on the lay shaft 63. The cam 140 coacts with a lever 145 pressed upwardly by a spring 146 shown as adjustable by a screw 147 mounted in the gear casing cover 68. The lever 145 coacts with the bar 132 and is adapted to occupy a notch 148 therein and retain that bar against return movement until the lever 145 is depressed.

Whenever the plunger 50 is shoved down, as heretofore described, it carries the bar 132 to the left in Fig. 2, the beveled end 149 camming the lever 145 downwardly and the spring 146 returning this lever into the notch 148. This engagement holds the bar 132 when the pressure of the operator's hand is removed from the plunger 50, and thus the clutch remains in engagement as the rotation continues. However, as the rotation is just being completed, the cam 140 shoves downwardly on the bar 145, releasing it from the bar 132 and the latter is returned by the spring 130, thus releasing the clutch.

It will be seen that I have provided a very readily operable single-rotation clutch. A single downward pressure on the plunger 50 causes the clutch to engage; then, whether that pressure is continued or not, the clutch rotates for at least a rotation. If the pressure is continued beyond that rotation, the clutch continues engaged for a subsequent rotation or rotations. If however, the pressure is relieved at any time during a given rotation the movement stops at the completion of that rotation.

It is sometimes desired to lock the clutch continuously in engagement, or lock it in disengaged position so that the machine may be turned freely by hand. To accomplish this I provide the following mechanism:

The shipper lever 110 extends forwardly of the frame in position to be readily engaged by the operator at 150. This lever passes through a slotted keeper plate 151 (Figs. 2 and 3) secured to and depending from the front wall of the frame 52. In ordinary operation, the lever oscillates in the upper an uninterrupted portion 153 of the slot in the keeper. However, this slot has two downward extensions 154 and 155, Fig. 2, each with an inwardly inclined end on the side toward which the spring 130 tends to draw the lever 110. The corresponding edge of the lever 110 is correspondingly beveled, as shown at 156.

It results from the mechanism just described that as the lever 110 is forced downwardly into either of the extension notches 154 or 155, the effect of the spring 130 is to hook the lever beneath the overhanging end of the slot and retain it in this position. When the lever is in the notch 154, the clutch is engaged and will remain so for continuous rotations until the lever is released. When the lever is in the notch 155 the shipper collar 100 is in an intermediate position and neither is the clutch applied nor the brake engaged. The result is that the printing machine is entirely free from the power drive and may be turned by hand as desired.

It will be seen that I have provided a simple and efficient power drive which occupies little space, being mounted out of the way on a top for the stand which carries the printing machine. The provision of giving the power drive a normal operation of periodic single rotations, with the feature for locking it either in continuous operation or entirely disengaged, allows ready control to meet all conditions arising in practice. The top of the hand operated plunger in such case may readily form a rest for the operator's hand in the position which that hand naturally occupies in placing an address plate on the drum or receiving it therefrom. Such feature is claimed in the parent application mentioned.

My prior application No. 113,601, filed June 4, 1926, of which this is a division, shows the multigraph equipped to carry a changeable address plate, shoved into place from the left hand end of the machine.

Having thus described my invention, I claim:

1. In a power drive mechanism, the combination with a machine to be driven, of a rotary shaft, a train of gearing connecting the same with the machine to be driven, a clutch for controlling the shaft, a shipper lever for the clutch, a longitudinal sliding bar connected with the shipper lever, manual means for moving the bar, and a spring tending to move the shipper lever in opposition to the movement caused by said manual means, a retaining device for the actuated bar, and a cam geared with the member to be driven and periodically acting means for moving the retaining device to releasing position.

2. The combination, with a driving shaft, of a clutch for delivering rotations thereto, a shipper lever for controlling the clutch, a keeper plate for the shipper lever having a shoulder adapted to overhang it and retain it in a certain position when the lever is manually diverted from its normal path of movement, and means operated for each cycle of operation of the driven machine to disengage the clutch when the shipper lever has not been diverted from its normal path.

3. The combination, with a driving shaft, of a clutch for delivering rotations thereto, a shipper lever for controlling the clutch, a manually operable device for moving the shipper lever in a certain path, a member having a shoulder adapted to retain the shipper lever in a certain position when the lever is manually diverted from its normal path of movement, and means operated for each cycle of operation of the driven machine to disengage the clutch when the shipper lever has not been diverted from its normal path.

4. The combination of a shaft, a clutch for delivering power thereto, a shipper lever for operating the clutch, a spring tending to move the shipper lever in the direction to release the clutch, a keeper for the shipper lever having a notch into which it may be pressed away from its normal path of movement, said spring then tending to hold the shipper lever in said notch, whereby the clutch may be retained definitely in a given position, and means operated for each cycle of operation of the driven machine to disengage the clutch when the shipper lever has not been diverted from its normal path.

5. The combination of a shaft to be driven, a clutch for applying power to the shaft, a brake for stopping rotation of the shaft, a shipper lever adapted in one extreme position to apply the clutch and in the other extreme position to apply the brake, and means for locking the shipper lever in an intermediate position, and means for automatically and periodically releasing the clutch.

6. The combination of a shaft, a clutch and a shipper lever for controlling the clutch, a spring tending to move the shipper lever to releasing position, retaining means for latching the shipper lever in its active position, periodically acting means to operate the retaining means to release the shipper lever, enabling the spring to release the clutch, said shipper lever operating in a slot in a keeper, said slot having a notch into which the shipper lever may be diverted to hold it continuously in a position with the clutch applied.

7. A combination, with a stand and a machine to be driven, of an intermediate member mounted on top of the stand and forming a support for said machine, which rests on top of said member, a rotary drive shaft mounted on the under side of said member, a gear driven by said shaft and accessible above the top plate and adapted to mesh with a gear on the driven machine, a clutch for controlling the drive shaft, said clutch being operable by a shiftable collar, mechanism for shifting said collar including a bar provided with a shoulder, a retaining member spring pressed to engage said shoulder and means adapted to act periodically on said retaining member to release said bar.

8. A combination of a frame, a power shaft carried thereby, a clutch on the shaft for applying power thereto, a brake disk rotatable with the shaft, a stationary member on the opposite side of the disk from the clutch, a collar slidable on the shaft between the brake disk and clutch and adapted by movement in one direction to set the clutch and by movement in the other direction to abut the brake disk and cause it to coact with the stationary member to apply the brake.

9. In a power drive mechanism, the combination of a rotary shaft, a train of gearing connected therewith and adapted to operate a member to be driven, a clutch for controlling the shaft, a shipper lever for the clutch, a longitudinal sliding bar connected with the shipper lever, a downwardly acting plunger, links and a bell crank connecting the same with the bar, a spring tending to move the shipper lever in opposition to the movement caused by the downward action of the plunger, and means operated once for each cycle of operation of the member being driven to disengage the clutch.

10. The combination with a machine to be driven, a plate for supporting it of power mechanism for driving said machine mounted on the under side of said plate and including a shaft geared with the machine and a clutch for controlling the shaft, a plunger passing through the plate, mechanism operable thereby for engaging the clutch, said plunger terminating at its upper end in a hand pad alongside of the machine, and means operated once for each cycle of operation of the member being driven to disengage the clutch.

In testimony whereof, I hereunto affix my signature.

HENRY C. OSBORN.